(12) United States Patent
Lee

(10) Patent No.: US 6,930,747 B2
(45) Date of Patent: Aug. 16, 2005

(54) IN-PLANE SWITCHING MODE LIQUID CRYSTAL DISPLAY DEVICE

(75) Inventor: Jae Kyun Lee, Gunpo-si (JP)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/465,840

(22) Filed: Jun. 20, 2003

(65) Prior Publication Data

US 2004/0125301 A1 Jul. 1, 2004

(30) Foreign Application Priority Data

Dec. 30, 2002 (KR) .............................. 10-2002-0086636

(51) Int. Cl.⁷ .......................................... G02F 1/1339
(52) U.S. Cl. ..................................... 349/155; 349/156
(58) Field of Search ........................ 349/141, 155–156

(56) References Cited

U.S. PATENT DOCUMENTS

| 6,323,927 | B1 | * | 11/2001 | Hiroshi | 349/141 |
| 6,337,730 | B1 | * | 1/2002 | Ozaki et al. | 349/156 |
| 6,417,907 | B2 | | 7/2002 | Choi et al. | |
| 6,646,709 | B2 | * | 11/2003 | Matsumoto | 349/156 |
| 6,683,671 | B1 | * | 1/2004 | Morimoto | 349/155 |
| 2001/0038435 | A1 | * | 11/2001 | Aoyagi et al. | 349/160 |
| 2003/0214623 | A1 | * | 11/2003 | Ebisu et al. | 349/156 |

* cited by examiner

*Primary Examiner*—Robert H. Kim
*Assistant Examiner*—Phu Vu
(74) *Attorney, Agent, or Firm*—McKenna Long & Aldridge LLP

(57) ABSTRACT

An in-plane switching mode liquid crystal display device includes a lower substrate having pixels arranged thereon in a matrix, each pixel being defined and surrounded by a gate line and a pair of adjacent data lines crossing substantially normal to the gate line, a common line, an upper substrate having a black matrix and a color filter formed thereon, a spacer formed on the lower substrate including the region adjacent to the data lines, and a liquid crystal layer interposed between the lower substrate and the upper substrate.

33 Claims, 5 Drawing Sheets

IN-PLANE SWITCHING MODE LIQUID CRYSTAL DISPLAY DEVICE

This application claims the benefit of the Korean Application No. P2002-86636 filed on Dec. 30, 2002, which is hereby incorporated by reference for all purposes as if fully set forth herein.

BACKGROUND OF THE INVENTION

1. Field of the Invention

The present invention relates to a liquid crystal display device, and more particularly, to an in-plane switching mode liquid crystal display device having a pattern of spacers.

2. Discussion of the Related Art

Generally, a liquid crystal display (LCD) device operates by optical anisotropy and polarization of a liquid crystal material therein. Since the liquid crystal material includes liquid crystal molecules, each having a thin and long structure, the liquid crystal material has a specific orientation according to the alignment direction of the liquid crystal molecules. Hence, the alignment direction of the liquid crystal molecules can be controlled by applying an external electric field to the liquid crystal. As the alignment of the liquid crystal molecules is changed by applying an electric field, light polarization caused by the optical anisotropy of the liquid crystal material is modulated to display image information.

One of the LCD devices widely used is a twisted nematic (TN) mode LCD device. The TN mode LCD device is configured in such a manner that an electrode is provided on each of the two substrates respectively. The direction of the liquid crystal molecules is arranged to be twisted at an angle of 90°. The TN LCD device operates such that the direction of the liquid crystal molecules is arranged by applying an electric field. However, the TN mode LCD device has a disadvantage of having a narrow viewing angle.

Therefore, various new methods have been actively developed and studied in order to solve the problem of the narrow viewing angle. An in-plane switching (IPS) mode and an optically compensated birefringence (OCB) mode are some examples of the results of the above study.

The IPS mode LCD device is configured such that two electrodes are provided on one common substrate, and liquid crystal molecules are rotated relative to the substrate with their long axes remaining substantially in parallel with the substrate. Then, an electric field is generated with respect to the substrate in parallel therewith by applying voltages between the two electrodes. That is, the major axis of the liquid crystal molecule does not rise with respect to the substrate. Therefore, since the birefringence change of the liquid crystal in the viewing direction is small, the viewing angle becomes much improved compared with that of the related art TN mode LCD device.

FIG. 1 is a plan view of a part of a lower substrate of an IPS mode LCD device.

Referring to FIG. 1, the lower substrate includes a plurality of gate lines 13 and common lines 54 substantially in parallel with each other and a plurality of data lines 15 substantially perpendicular to the gate lines 13 and common lines 54.

Pixels 10 are defined in the lower substrate as the region surrounded by the gate lines 13, the common lines 54, and the data lines 15, 15'.

Further, a gate electrode 31 is formed at one side of the gate line 13, and a source electrode 33 is formed at one side of the data line 15 adjacent to the gate electrode 31 and partially overlapping the gate electrode 31. A drain electrode 35 is formed to face the source electrode 33 and is space from the source electrode 33 by an interval. Together, the gate electrode 31, the source electrode 33 and the drain electrode 35 form a thin film transistor region (T).

Further, the common line 54 has a plurality of common electrodes 54a extending therefrom. The drain electrode 35 is connected to a lead interconnection line 37 from which pixel electrodes 37a extend. The common electrode 54a and the pixel electrode 37a are formed in an alternating manner. An image display region of the pixel 10 is formed by the plurality of the common electrodes 54a and the pixel electrodes 37a.

A common voltage input from the common lines 54 is applied to the common electrodes 54a formed in the pixel 10. Various levels of image signals are applied to the subpixel via the data line 15 when a gate voltage is applied via the gate line and gate electrode.

Therefore, a plane electric field is formed by the voltage applied to the pixel electrode 37a and the common electrode 54a, and the alignment degree of the liquid crystal molecules can be varied depending on the intensity of such electric field so as to display images.

A block 39 refers to a region in which images are displayed by the pixel electrode 37a and the common electrode 54a according to the applied plane electric field. Each pixel 10 includes a plurality of the blocks 39. As illustrated in FIG. 1, a four-block type in which four blocks 39 are formed in one pixel 10 is widely used.

FIG. 2 is a sectional view of a related art in-plane switching mode LCD device taken along the line I–I' of FIG. 1.

Referring to FIG. 2, the related art in-plane switching mode LCD device is configured such that a black matrix 8 and a color filter 6 are formed on an upper substrate 5. A lower substrate 22 is provided with the pixels 10 as illustrated in FIG. 1 arranged in a matrix. In addition, the liquid crystal 20 as described above is in a predetermined gap between the upper substrate 5 and the lower substrate 22, and the two substrates are sealed by a sealant (not shown) deposited on the edges of the substrates.

Further, spacers (not shown) are disposed between the upper substrate 5 and the lower substrate 22 to maintain the predetermined gap between the substrates 5 and 22 so that the liquid crystal 20 can be injected therebetween or applied by dispensing.

Light does not penetrate the LCD device as illustrated in FIGS. 1 and 2 except in the image display regions of the pixel 10, i.e., the four blocks 39. Therefore, penetration of unnecessary light is shielded in the region except for the four blocks 39 where the region corresponds to the black matrix 8 of the upper substrate 5.

However, because the data lines 15, 15' and the common electrodes 54a, 54a' adjacent to the data lines 15, 15' are not included in the blocks 39, they are shadowed by the black matrix 8, as illustrated in FIG. 2. Accordingly, even though the data lines 15, 15' and the common electrodes 54a, 54a' are shielded by the black matrix 8, light leakage can occur where there is misalignment of the upper and lower substrates 5, 22 during manufacturing.

Particularly, as the substrate size becomes large, a misalignment of the upper and lower substrates 5, 22 becomes more serious. Therefore, it may be necessary to widen the width of the black matrix 8 of the upper substrate 5 sufficient to cover a part of the blocks 39, as illustrated in FIG. 2, which results in the decrease of the final aperture ratio.

Further, as illustrated in FIG. 2, even though the width of the black matrix 8 is widened, the light leakage may also occur due to the refraction of light in that region.

Before the explanation of an in-plane switching mode LCD device of the present invention, a spacer formed between an upper substrate and a lower substrate is explained to maintain a space therebetween.

The spacer is distributed between the upper and lower substrates to maintain a cell gap uniform, and there are various types of spacers, such as a fiber-shaped spacer, an elastic ball-shaped spacer, or an adhesive spacer.

However, since the spacer particles are dispersed on the substrate randomly, the spacer is sometimes found to exist inside an effective pixel region, which causes a problem in that the spacer is seen, or incident light is scattered thereby decreasing the contrast of a liquid crystal panel.

Therefore, a method has been introduced for forming the spacer by using a photolithography process to solve the above problem. The method is performed by depositing a photoresist layer on the substrate, and illuminating ultraviolet rays through a mask before developing the substrate to form a dot or stripe-shaped spacer. The spacer is formed in a region other than an effective pixel region, and the cell gap can be controlling by the thickness of the photoresist layer, which provides advantages of controlling the width of the cell gap easily and increasing the precision.

As described above, spots may be seen on the image display of the related art in-plane switching mode LCD device due to light leakage.

SUMMARY OF THE INVENTION

Accordingly, the present invention is directed to an in-plane switching mode liquid crystal display device that substantially obviates one or more problems due to limitations and disadvantages of the related art.

An advantage of the present invention is to provide an in-plane switching mode liquid crystal display device for preventing a light leakage phenomenon by forming a patterned spacer in a specific region of a lower substrate where liquid crystal material is not formed.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an in-plane switching mode liquid crystal display device comprises a first substrate having pixel areas, each pixel area being defined by a gate line and data lines; a thin film transistor having a drain electrode, each of the pixel areas including the thin film transistor a common line, a plurality of common electrodes extending from the common line, and a plurality of pixel electrodes; a lead interconnection line connected between the drain electrode of the thin film transistor and the pixel electrodes; a second substrate spaced from the first substrate by a gap; a pattern of spacers, each spacer over a region including a data line and a common electrode adjacent to the data line on the first substrate; and a liquid crystal layer between the first substrate and the second substrate.

In another aspect of the present invention, an in-plane switching mode liquid crystal display device, comprises a first substrate having pixel areas, each pixel area being defined by a gate line and data lines, each pixel area including a switching device, a common line, a plurality of common electrodes extending from the common line, and a plurality of pixel electrodes connected to a lead interconnection line between the switching device and the pixel electrodes; a second substrate spaced from the first substrate by a gap; first spacer and second spacer over a region including a data line, the data line being located substantially between the first and second spacers, the first spacer at least partially overlapping a common electrode adjacent the data line; and a liquid crystal layer between the first substrate and the second substrate.

In another aspect of the present invention, a method of manufacturing an in-plane switching mode liquid crystal display device, comprises forming a first substrate having pixel areas, each pixel area being defined by a gate line and data lines; forming a thin film transistor having a drain electrode, each of the pixel areas including the thin film transistor a common line, a plurality of common electrodes extending from the common line, and a plurality of pixel electrodes; forming a lead interconnection line connected between the drain electrode of the thin film transistor and the pixel electrodes; forming a pattern of spacers, each spacer over a region including a data line and a common electrode adjacent to the data line on the first substrate; and attaching a second substrate to the first substrate, the second substrate being spaced from the first substrate by a gap.

In another aspect of the present invention, an in-plane switching mode liquid crystal display device includes a lower substrate having pixels arranged thereon in a matrix, each pixel being defined and surrounded by a plurality of gate lines and data lines, each pixel including a thin film transistor, a common line, a plurality of common electrodes extending from the common lines, and a plurality of pixel electrodes extending from a lead interconnection line connected with a drain electrode of the thin film transistor; an upper substrate having a black matrix and a color filter thereon, the upper substrate facing the lower substrate and spaced apart from the lower substrate by a predetermined gap; a spacer over a region including the data lines and the common electrodes adjacent to the data lines on the lower substrate; and a liquid crystal layer between the lower substrate and the upper substrate.

Further, the black matrix formed on the upper substrate may be located over the region including the data lines and the common electrodes adjacent to the data lines on the lower substrate shield the light passing through the region including the data lines and the common electrodes.

In another aspect of the present invention, an in-plane switching mode liquid crystal display device includes a lower substrate having pixels aligned in a matrix, an upper substrate having a black matrix and a color filter, a liquid crystal layer between the lower substrate and the upper substrate, and a spacer formed by patterning over the lower substrate.

The structure and elements of the pixel are the same as those of the liquid crystal display device described before, but the location and the pattern configuration of the spacers are different.

Thus, the spacer formed by patterning in the present invention may be provided over just the region including the common electrodes adjacent to the data lines on the lower substrate. The pattern of spacers may be configured such that there are two separate spacers in the region including the data lines, and the liquid crystal may be included between the two separate spacers in the region.

In a further aspect of the present invention, an in-plane switching mode liquid crystal display device includes a lower substrate having pixels aligned in a matrix, each pixel being defined and surrounded by a gate line, a common line, and a pair of adjacent data lines crossing the gate line and the common line, an upper substrate having a black matrix and a color filter, a spacer formed on the lower substrate including a region adjacent to the data line, and a liquid crystal layer between the lower substrate and the upper substrate.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

In the drawings.

DETAILED DESCRIPTION OF THE INVENTION

Reference will now be made in detail to the embodiments of the present invention, examples of which are illustrated in the accompanying drawings. Wherever possible, the same reference numbers will be used throughout the drawings to refer to the same or like parts.

A method for forming the spacer of the LCD device according to the present invention is illustrated with reference to FIGS. 3A to 3D which provides sectional views of the method steps.

Figure 3A:
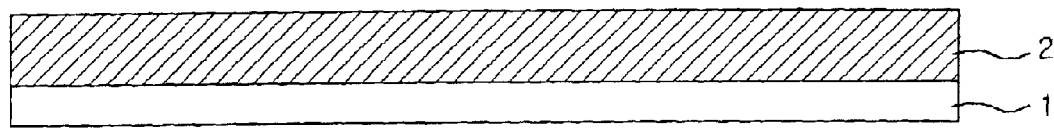
FIGS. 3A to 3D are sectional views to show the steps for manufacturing a spacer of an LCD device according to the present invention.

First, a photoresist layer 2 is deposited on a lower substrate 1 by using spin-coating method, for example, as illustrated in FIG. 3A. The lower substrate 1 includes pixels arranged in a matrix. The photoresist material includes a photoresist with sufficient characteristics to act as a spacer for the liquid crystal display. For example, a photo acryl may be used. Moreover, the photo acryl may have a hardness of 3–4H, for example.

Figure 3B:
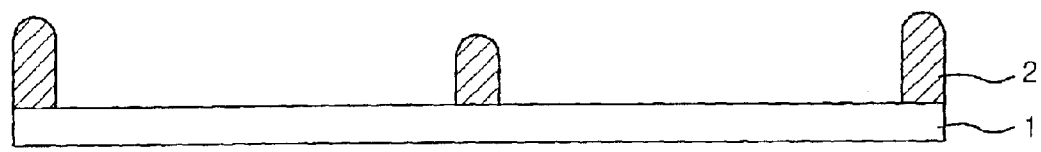

Then, as illustrated in FIG. 3B, ultraviolet light is selectively illuminated on the photoresist layer 2 using a mask (not shown) to develop the photoresist to form a pattern in the photoresist layer 2.

Figure 3C:
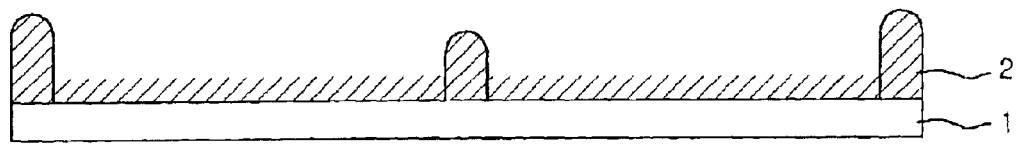

Referring to FIG. 3C, a rubbing or other alignment treatment is performed on the lower substrate 1 having the pattern of the photoresist layer 2 formed thereon so that a desired alignment is achieved when liquid crystal is supplied between the substrates in a subsequent process.

Figure 3D:
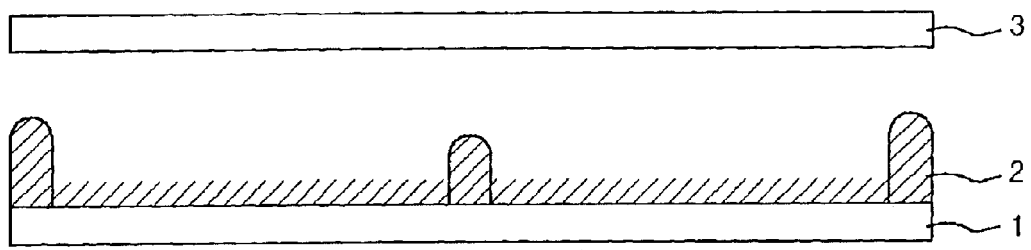

Finally, as illustrated in FIG. 3D, an upper substrate 3 is attached to the lower substrate 1. Although not illustrated in the figures, liquid crystal may be dispensed onto one of the substrates before they are attached together with a sealant.

A detailed explanation according to the embodiments of the present invention will be made with reference to the attached drawings.

Figure 4:
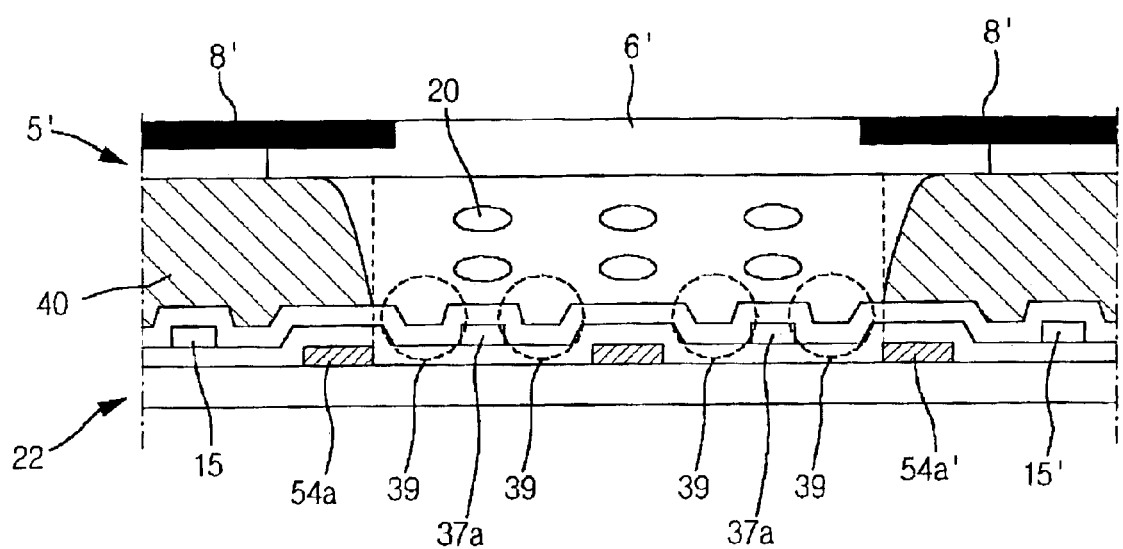
FIG. 4 is a sectional view of an in-plane switching mode LCD device according to one embodiment of the present invention.

FIG. 4 is a sectional view of an in-plane switching mode LCD device according to one embodiment of the present invention. In particular, FIG. 4 is a sectional view illustrating the region around one specific pixel on the lower substrate. Although there may be some variation, the lower substrate of the present invention has basically the same structure as that of the related art lower substrate of FIG. 1. Therefore, similar reference numerals will be used for like elements also indicated in FIG. 1.

Figure 1:
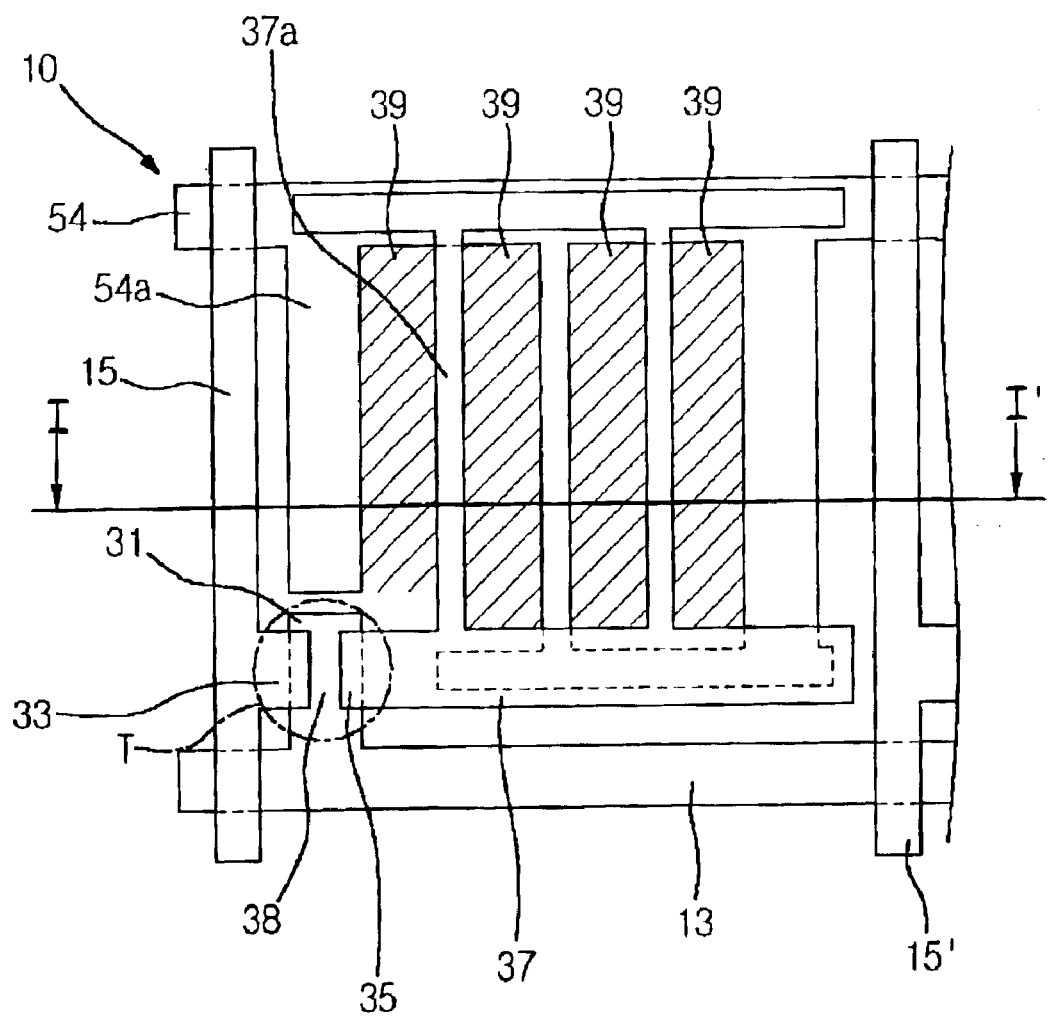
FIG. 1 is a plane view of a part of the lower substrate of a related art in-plane switching mode LCD.

Referring to FIG. 4, the in-plane switching mode LCD device according to one embodiment of the present invention includes an upper substrate 5' having a black matrix 8' and a color filter 6' formed thereon, and a lower substrate 22 having pixels 10, illustrated in FIG. 1, formed thereon in a matrix shape. A liquid crystal 20 as explained above is provided between the upper substrate 5' and the lower substrate 22, which are attached to each other by a deposited sealant (not shown) on their edges.

Further, a spacer 40 is formed between the upper substrate 5' and the lower substrate 22, for providing a space where the liquid crystal 20 is provided.

The spacer 40 is a patterned spacer which is formed by the method described with reference to FIG. 3, for example, and is formed over a region including data lines 15, 15' and common electrodes 54a, 54a' adjacent to the data lines 15, 15' on the lower substrate 22.

Referring to FIG. 4, light does not penetrate through the pixel region illustrated in the figure except at an image display region corresponding to the region between the data electrodes 37a and the common electrodes 54a, 54a' formed on the lower substrate 22, that is, four blocks 39 illustrated in FIG. 1. Accordingly, unnecessary light is blocked from passing through the upper substrate 5' by the black matrix 8'. Here, the spacer 40 may also act as a light shielding element to further block undesired light.

Figure 2:
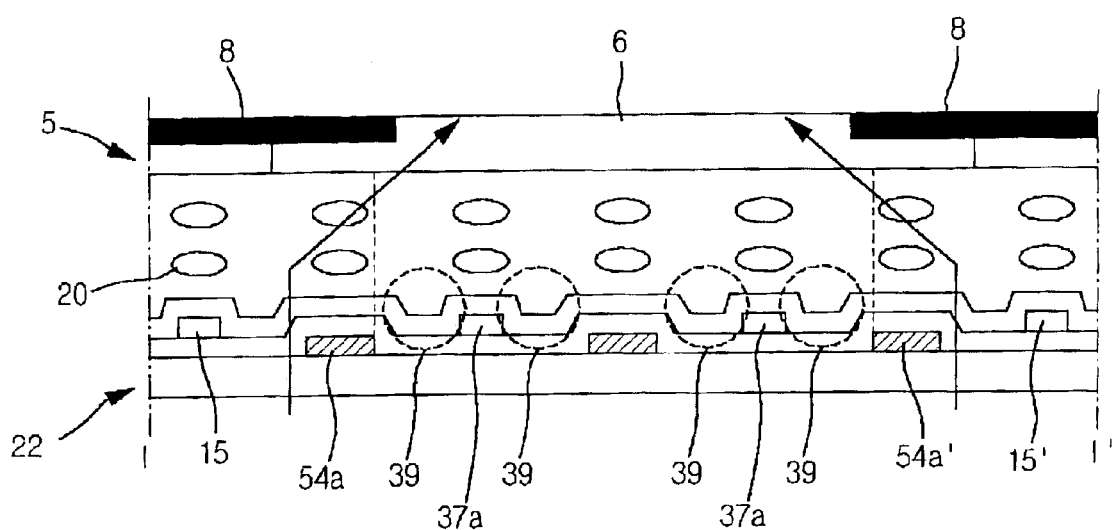
FIG. 2 is a sectional view of the related art in-plane switching mode LCD device taken along the line I–I' of FIG. 1.

In the related art case, the data lines 15, 15' and the common electrodes 54a, 54a' adjacent to the data lines 15, 15' as shown in FIG. 2, which do not belong to the block 39 region, are covered by the black matrix 8. However, even if the region other than the region of the display blocks 39 is shielded by the black matrix 8, light from a backlight unit (not shown) may be refracted by the liquid crystal 20 provided between the upper substrate 5 and the lower substrate 22. Thus, light can penetrate into the region where the black matrix 8 is not formed, causing failure. Further, to solve this problem in the related art the black matrix 8 is formed rather wide to cover a part of the block 39 region, which decreases the aperture ratio.

In one embodiment of the present invention to solve the problem, the patterned spacer 40 is formed over the region including the data lines 15, 15' and the common electrodes 54a, 54a' adjacent to the data lines 15, 15' on the lower substrate 22 as illustrated in FIG. 4. As described above, if the patterned spacer 40 is formed over the region including the data lines 15, 15' and the common electrodes 54a, 54a' adjacent to the data lines 15, 15' on the lower substrate 22, the liquid crystal is not placed in the region. Thus, light from the lower back light cannot enter the region between the data lines 15, 15' and the adjacent common electrodes 54, 54' because the spacer occupies that region, even if the LCD device is in a normally black mode.

Therefore, even though the upper substrate 5' and the lower substrate 22 are misaligned, a light leakage phenomenon can be prevented.

Accordingly, the present invention does not require the widening of the black matrix 8' and as a result, the occurrence of the light leakage phenomenon is minimized and the aperture ratio of the image display region can be improved.

Figure 5:
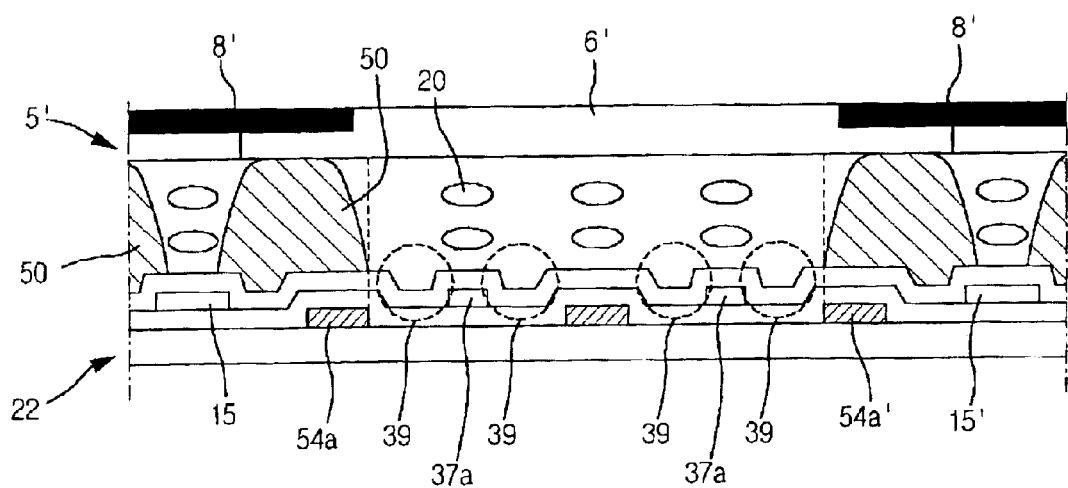
FIG. 5 is a sectional view of an in-plane switching mode LCD device according to another embodiment of the present invention.

Moreover, the width of the black matrix 8' may be reduced in the present invention because the spacer 40 acts to block the light leakage. For example, the black matrix 8' need not extend up to the right/left most edge of the common electrode 54a and 54a' (such as shown in FIG. 5). Thus, the black matrix 8' may be reduced as much as about 5 $\mu$m, for example, at one side.

It should also be noted that the spacer 40 may be formed to extend short of the right/left most edge of the common electrode 54a and 54a' in accordance with a tolerance level of the manufacturing process. For example, the end of the spacer 40 may be as much as about 5 $\mu$m or more short of the end of the common electrode 54a and 54a', as long as the light leakage is prevented.

FIG. 5 is a sectional view of an in-plane switching mode LCD device according to another embodiment of the present invention. In particular, FIG. 5 is a sectional view including a specific pixel region on a lower substrate, and the lower substrate of the present invention has basically the same structure as that of the related art lower substrate of FIG. 1. Therefore, similar reference numerals will be used for like elements from FIG. 1.

Referring to FIG. 5, the structure of the LCD device is similar to that of FIG. 4, except that the location of a patterned spacer 50 between a lower substrate 22 and an upper substrate 5' is different from that of the embodiment shown in FIG. 4.

In particular, the embodiment of the present invention illustrated in FIG. 5 is especially useful in the case where the width of the data lines 15, 15' aligned on the lower substrate 22 is wide, and the patterned spacer 50 is formed over the region including the common electrodes 54a, 54a' adjacent to the data lines 15, 15' on the lower substrate 22. Here, the spacer 50 may or may not be partially over the data lines 15, 15'.

In other words, there may be two or more patterned spacers 50 in FIG. 5 (although only two spacers are shown, for example) in the same or similar region where only one patterned spacer 40 exists in FIG. 4. If two spacers 50 occupy this region, for example, then the two spacers may have a complete or partial gap between them. In the gap, liquid crystal 20 may exist. Thus, the liquid crystal 20 can be in the region over the data lines 15, 15', and the spacers 50 may be separated by a gap with or without the liquid crystal 20. Moreover, the gap may also act to receive overflow of liquid crystal such as when liquid crystal dispensing method is used to form the liquid crystal layer between the upper and lower substrates.

In this case, even though light is illuminated on the liquid crystal 20 located in the region over the data lines 15, 15', the light is blocked by a black matrix 8' and does not allow light leakage.

As shown in FIG. 5, there are two spacers 50 corresponding to one data line 15, for example. Between the two spacers, there is a pocket of space to receive the liquid crystal. In this instance, this pocket of space may also be used to received extra or overflow liquid crystal when a liquid crystal dispensing method is used, for example. The pocket space may be formed the entire length of the cell gap or less than the cell gap such as a groove.

Accordingly, as described above, a spacer or spacers are formed on the lower substrate 22 at the region adjacent to the data lines 15, 15' according to the embodiments of the present invention and a refraction of light by the liquid crystal does not occur. Moreover, a light leakage phenomenon is prevented.

Further, according to the present invention, it is not necessary to increase the width of the black matrix to prevent the light leakage phenomenon as in the related art case. Thus, the present invention has an advantage of improving the aperture ratio of the image display region.

As described above, according to the in-plane switching mode LCD device of the present invention, a light leakage phenomenon is prevented, and spots generated on a displayed image can be minimized. Furthermore, the aperture ratio is improved because the width of the black matrix formed on the upper substrate is minimized.

The present invention also contemplates using photoresist that is opaque enough to be used as a light shielding element. In this instance, the light shielding photoresist acts both as a spacer and a black matrix. Such photoresist may further block light in addition to the black matrix on the upper substrate or the black matrix on the upper substrate may not be needed.

Moreover, although the present invention has been explained with reference to four blocks in one pixel, different number of blocks may be used and is contemplated in the present invention.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. An in-plane switching mode liquid crystal display device, comprising:
   a first substrate having pixel areas, each pixel area being defined by a gate line and data lines;
   a thin film transistor having a drain electrode, each of the pixel areas including the thin film transistor, a common line, a plurality of common electrodes extending from the common line, and a plurality of pixel electrodes;
   a lead interconnection line connected between the drain electrode of the thin film transistor and the pixel electrodes;
   a second substrate spaced from the first substrate by a gap;
   a pattern of spacers, each spacer over a data line and the common electrode adjacent to the data line on the first substrate; and
   a liquid crystal layer between the first substrate and the second substrate.

2. The in-plane switching mode liquid crystal display device of claim 1, wherein the gate line and the common line on the first substrate are substantially in parallel in a first direction, and the plurality of data lines are formed in a second direction crossing the gate line and the common line.

3. The in-plane switching mode liquid crystal display device of claim 1, wherein the plurality of common electrodes and the plurality of pixel electrodes in the pixel area are substantially parallel and arranged in an alternating manner.

4. The in-plane switching mode liquid crystal display device of claim 1, further comprising a black matrix on the second substrate over the region including the data lines and the common electrodes adjacent to the data lines on the first substrate, the black matrix preventing light from passing through the region.

5. The in-plane switching mode liquid crystal display device of claim 1, wherein the spacer includes a photoresist material.

6. The in-plane switching mode liquid crystal display device of claim 5, wherein the photoresist includes a photoresist material having a hardness of about 3H to 4H.

7. The in-plane switching mode liquid crystal display device of claim 5, wherein the photoresist is opaque and acts as a black matrix.

8. The in-plane switching mode liquid crystal display device of claim 1, wherein the spacer has an edge substantially flush with an edge of the common electrode adjacent to the data line.

9. The in-plane switching mode liquid crystal display device of claim 1, wherein the spacer has an edge ending prior to a right edge of the common electrode adjacent to the data line.

10. The in-plane switching mode liquid crystal display device of claim 9, wherein a difference between the edge of the spacer and the right edge of the common electrode is less than 5 µm.

11. The in-plane switching mode liquid crystal display device of claim 1, further comprising a black matrix on the second substrate, wherein the spacer has an edge substantially flush with an edge of the common electrode adjacent to the data line and an edge of the black matrix.

12. The in-plane switching mode liquid crystal display device of claim 1, further comprising a black matrix on the second substrate wherein an edge of the black matrix ends short of an edge of the spacer, whereby a maximum aperture ratio of the pixel area is maintained.

13. The in-plane switching mode liquid crystal display device of claim 1, wherein the common line is located at an opposite end of the pixel area relative to the gate line.

14. The in-plane switch mode liquid crystal display device of claim 1, wherein the region including the data line and the common electrode adjacent to the data line on the first substrate includes first and second spacers.

15. An in-plane switching mode liquid crystal display device, comprising:
    a first substrate having pixel areas, each pixel area being defined by a gate line and data lines, each pixel area including a switching device, a common line, a plurality of common electrodes extending from the common line, and a plurality of pixel electrodes connected to a lead interconnection line between the switching device and the pixel electrodes;
    a second substrate spaced from the first substrate by a gap;
    a first spacer and a second spacer over a data line, the data line being located substantially between the first and second spacers, and the first spacer at least partially overlapping the common electrode adjacent the data line; and
    a liquid crystal layer between the first substrate and the second substrate.

16. The in-plane switching mode liquid crystal display device of claim 15, wherein a space is between the first and second spacers.

17. The in-plane switching mode liquid crystal display device of claim 16, wherein the space is empty.

18. The in-plane switching mode liquid crystal display device of claim 16, wherein the space includes liquid crystal.

19. The in-plane switching mode liquid crystal display device of claim 16, wherein the space extends from the first substrate to the second substrate.

20. The in-plane switching mode liquid crystal display device of claim 16, wherein the space is a groove.

21. An in-plane switching mode liquid crystal display device, comprising:
    a first substrate having pixel areas, each pixel area being defined and surrounded by a gate line and data lines, each pixel area including a thin film transistor having a drain electrode, a common line, a plurality of common electrodes extending from the common line, and a plurality of pixel electrodes extending from a lead interconnection line connected to the drain electrode of the thin film transistor;
    a second substrate facing the first substrate and spaced apart from the first substrate by a gap;
    a pattern of spacers, each spacer over a data line and the common electrode adjacent to the data line on the first substrate; and
    a liquid crystal layer between the first substrate and the second substrate.

22. The in-plane switching mode liquid crystal display device of claim 21, wherein the gate line and the common line on the first substrate are substantially in parallel in a first direction, and the plurality of data lines are formed in a second direction crossing the gate line and the common line.

23. The in-plane switching mode liquid crystal display device of claim 21, wherein the plurality of common electrodes and the plurality of pixel electrodes in the pixel are substantially parallel and arranged in an alternating manner.

24. The in-plane switching mode liquid crystal display device of claim 21, further comprising a black matrix on the second substrate above the region including the data lines, the black matrix preventing light from passing through the region.

25. The in-plane switching mode liquid crystal display device of claim 21, wherein the spacer includes a photoresist material.

26. The in-plane switching mode liquid crystal display device of claim 25, wherein the photoresist includes a photoresist material having a hardness of about 3H to 4H.

27. The in-plane switching mode liquid crystal display device of claim 25, wherein the photoresist is opaque and acts as a black matrix.

28. The in-plane switching mode liquid crystal display device of claim 21, further comprising a black matrix on the second substrate, wherein the spacer has an edge substantially flush with an edge of the black matrix.

29. The in-plane switching mode liquid crystal display device of claim 21, further comprising a black matrix on the second substrate wherein an edge of the black matrix ends short of an edge of the spacer.

30. The in-plane switching mode liquid crystal display device of claim 21, wherein the common line is located at an opposite end of the pixel area relative to the gate line.

31. An in-plane switching mode liquid crystal display device, comprising:
    a first substrate having pixel areas, each pixel area being defined by a gate line and data lines, each pixel including a switching device, a common line, a plurality of common electrodes extending from the common line, and a plurality of pixel electrodes extending from a lead interconnection line connected to the switching device,
wherein the gate line and the common line on the first substrate are substantially in parallel in a first direction, and the plurality of data lines are in a second direction crossing the gate line and the common line,
wherein the plurality of common electrodes and the plurality of pixel electrodes in the pixel area are substantially parallel and arranged in an alternating manner;
a second substrate facing the first substrate and spaced apart from the first substrate by a gap;
a pattern of spacers, each spacer including a photoresist material over a data line and the common electrode adjacent to the data line on the first substrate;
a black matrix on the second substrate over the region including the data line and the common electrode adjacent to the data line on the first substrate, the black matrix preventing light from passing through the region; and
a liquid crystal layer between the first substrate and the second substrate.

32. A method of manufacturing an in-plane switching mode liquid crystal display device, comprising:
forming a first substrate having pixel areas, each pixel area being defined by a gate line and data lines;
forming a thin film transistor having a drain electrode, each of the pixel areas including the thin film transistor a common line, a plurality of common electrodes extending from the common line, and a plurality of pixel electrodes;
forming a lead interconnection line connected between the drain electrode of the thin film transistor and the pixel electrodes;
forming a pattern of spacers, each spacer over a data line and the common electrode adjacent to the data line on the first substrate; and
attaching a second substrate to the first substrate, the second substrate being spaced from the first substrate by a gap.

33. The in-plane switching mode liquid crystal display device of claim 32, wherein liquid crystal is provide on one of the first and second substrates prior to attaching the first and second substrates together.

\* \* \* \* \*